Oct. 29, 1957  E. BARLOW ET AL  2,811,659
DYNAMO ELECTRIC MACHINES
Filed May 8, 1956  2 Sheets-Sheet 1

INVENTORS
Ernest Barlow
Edward W. Consterdine
ATTORNEYS

Oct. 29, 1957  E. BARLOW ET AL  2,811,659
DYNAMO ELECTRIC MACHINES

Filed May 8, 1956  2 Sheets-Sheet 2

INVENTORS
Ernest Barlow
Edward W. Considine
By Morris L. Pottman
ATTORNEYS

United States Patent Office 2,811,659
Patented Oct. 29, 1957

2,811,659

DYNAMO ELECTRIC MACHINES

Ernest Barlow, Sale, and Edward Whiteley Consterdine, Radcliffe, England, assignors to Metropolitan-Vickers Electrical Company Limited, London, England, a British company Application May 8, 1956, Serial No. 583,426

Claims priority, application Great Britain May 16, 1955

2 Claims. (Cl. 310—258)

This invention relates to dynamo electric machines. In certain types of dynamo electric machines, there is a risk of vibration being set up in the stationary member of the machine by electro-magnetic distortions due to the rotating magnetic field. This is particularly noticeable in two-pole machines.

It has previously been proposed to minimise the transmission of vibrations by flexibly supporting the stator core in a surrounding frame, and it is the main object of the invention to provide an improved arrangement of this type which, whilst permitting relative resilient movement between the core and the supporting stator frame, also allows the transmission of a large torque such as may be encountered under short circuit conditions.

The present invention comprises a dynamo electric machine having a stator core mounted in a stator frame by means of resilient support bars extending axially between inwardly projecting ribs of the stator frame, which supports along their mid parts are formed with inward projections for engaging core bars, the projections in said support bars having side lugs which respectively engage opposite sides of the core bars to transmit torque and the resilient members having a greater cross-sectional dimension tangentially than radially so as to support the stator core and to provide for a large torque transmission combined with the radial flexibility.

It will be appreciated that with such an arrangement there is only a local contact between the core bars and the support bars, and it has been found that such an arrangement tends to minimise transmission of vibration.

The resilient members may each extend between one pair of stator frame ribs or may extend over several so as to bridge two or more gaps, and in practical embodiments there may be arrays of several resilient members arranged in axial alignment and a number of such arrays may be distributed around the circumference of the core.

Conveniently the core bars are of square cross-section although other cross-sectional shapes may be employed.

In order that the invention may be more clearly understood reference will now be made to the accompanying drawings, in which.

Figure 1:
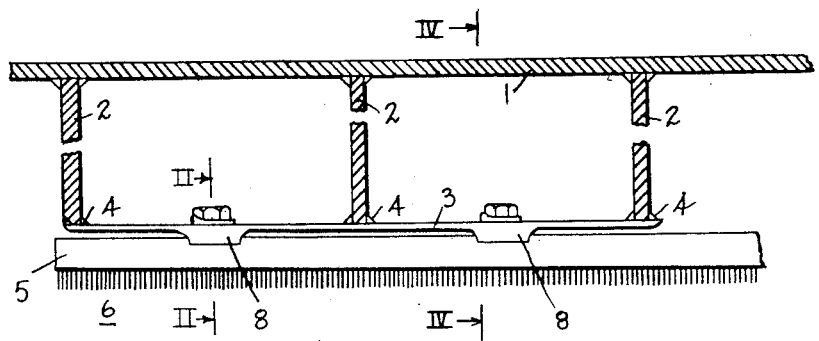
Fig. 1 is a part of the longitudinal sectional view of a stator frame and resilient supporting arrangement for the stator core.
Figure 2:
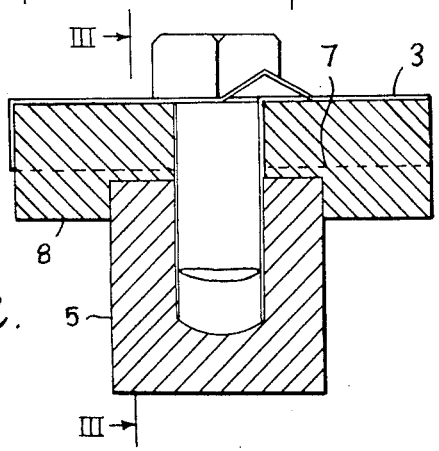
Fig. 2 is an enlarged sectional view on the line II—II of Fig. 1.
Figure 3:
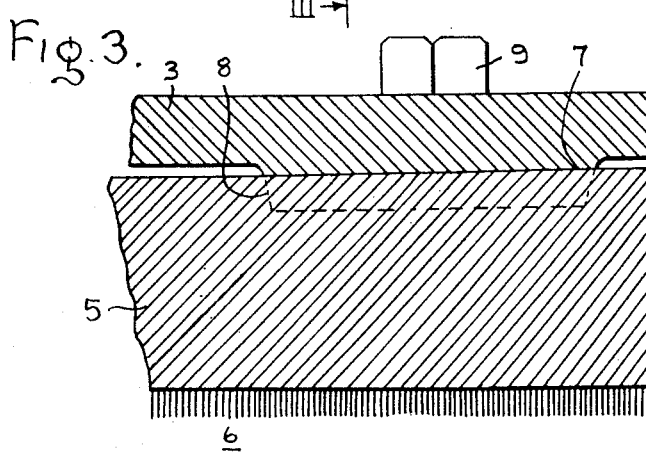
Fig. 3 is a cross-sectional view on the line III—III of Fig. 2.
Figure 4:
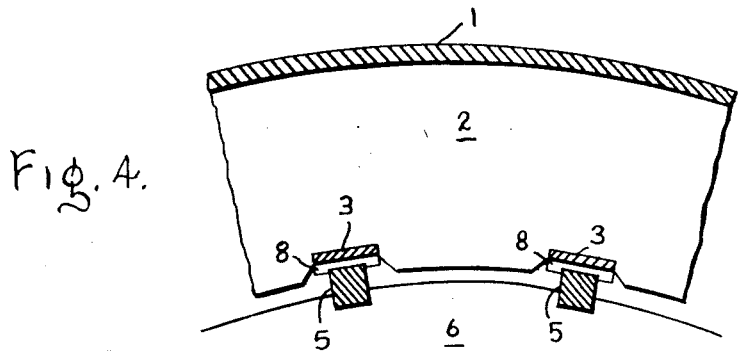
Fig. 4 is a cross sectional view (not enlarged) on the line IV—IV of Fig. 1.
Figure 5:
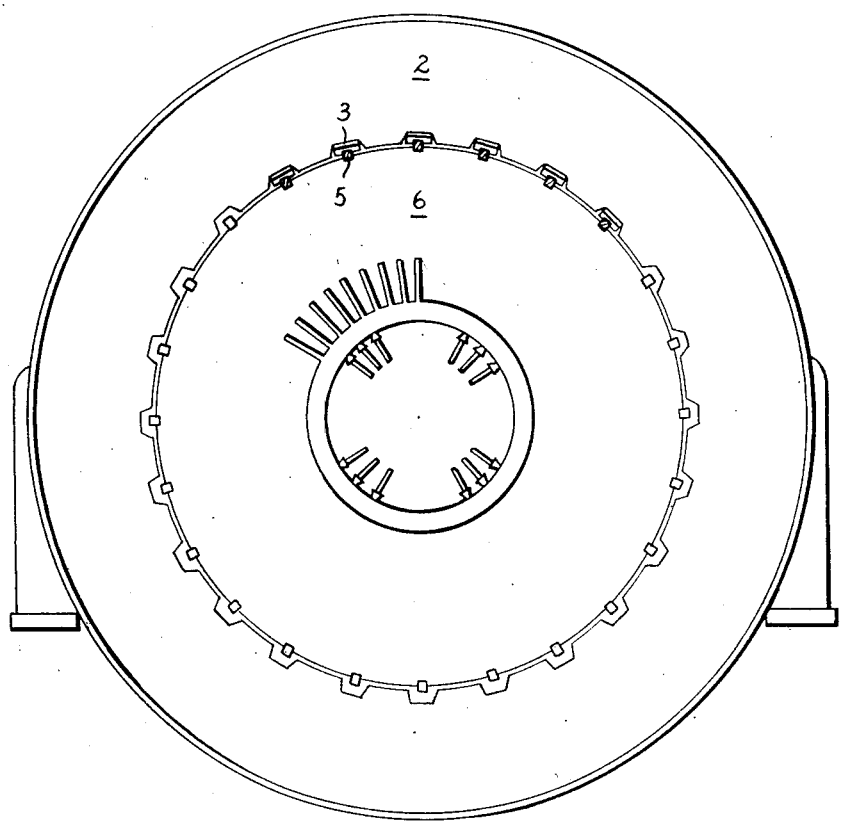
Fig. 5 is a transverse sectional view of a dynamo electric machine embodying the invention.

In Fig. 1 the reference 1 indicates the stator frame which is formed with a series of transverse ribs or webs 2 extending radially inwards. The inner edges of the ribs 2 and resilient support bars 3 which extend axially are welded at the point 4. In the actual arrangement shown, the support bar 3 extends across three of the ribs 2 i. e. it bridges two of the gaps. The support bars 3 in turn engage core bars 5 supporting the stator core 6. The resilient members 3 are of rectangular section and have an appreciably greater cross-sectional dimension tangentially than radially. The support bars 3 are, along the mid parts between the ribs 2, formed with inward projections 7, which engage the surfaces of the core bars and which have side lugs 8 which project radially inwards on respective opposite sides of the core bars 5. Connection is also made by means of bolts 9 which pass through the supporting bars and engage the core bar. It will be appreciated, however, that with this construction the bolts 9 are relieved of stress due to supporting stator core and to torque transmission since these stresses are wholly taken up by the side lugs 8. It will be appreciated that such a construction provides for a large torque transmission whilst permitting of sufficient degree of radial flexibility and at the same time the construction dose not noticeably interfere with the ventilation of the core.

What we claim is:

1. A dynamo-electric machine comprising a rotor, a stator frame and a stator core mounted in said frame, transverse ribs to said stator frame, axially extending core bars spaced apart circumferentially around the periphery of the core and at least partially embedded therein, flexible support bars extending axially between said ribs and secured thereto by welding at each end, inwardly extending projections at the central portion of each of said support bars each engaging an outer surface of a core bar, side lugs extending inwardly from each of said projections and engaging opposite radial sides of said core bars, and bolts extending axially each through one of said projections to secure the associated portion of the core bar thereto, the arrangement being such that there is no outward radial or tangential stress on said bolts.

2. A dynamo-electric machine comprising a rotor, a stator frame and a stator core mounted in said frame, transverse ribs to said stator frame, axially extending core bars spaced apart circumferentially around the periphery of the core and at least partially embedded therein, flexible support bars extending axially between said ribs and secured thereto by welding at each end, said support bars being of rectangular cross-section with a smaller dimension radially than circumferentially, inwardly extending projections at the central portion of each of said support bars each engaging an outer surface of a core bar, side lugs extending inwardly from each of said projections and engaging opposite radial sides of said core bars, and bolts extending axially each through one of the projections to secure the associated portion of the core thereto, the arrangement being such that there is no outward radial or tangential stress on said bolts.

References Cited in the file of this patent

UNITED STATES PATENTS 2,199,141    Rice _____ Apr. 30, 1940

FOREIGN PATENTS 1,065,467    France _____ Jan. 13, 1954
879,264    Germany _____ June 11, 1953